United States Patent [19]
Brader

[11] 4,087,626
[45] May 2, 1978

[54] SCRAMBLER AND UNSCRAMBLER FOR SERIAL DATA

[75] Inventor: Roy Henry Brader, Philadelphia, Pa.
[73] Assignee: RCA Corporation, New York, N.Y.
[21] Appl. No.: 711,449
[22] Filed: Aug. 4, 1976
[51] Int. Cl.[2] .......................... H04L 9/00; H04K 1/06
[52] U.S. Cl. ........................................ 178/22; 364/900
[58] Field of Search ...................... 178/22; 340/172.5

[56] References Cited

U.S. PATENT DOCUMENTS

| | | | |
|---|---|---|---|
| 3,631,406 | 12/1971 | Kurner | 340/172.5 |
| 3,657,699 | 4/1972 | Rocher | 178/22 |
| 3,731,197 | 5/1973 | Clark | 178/22 |
| 3,773,977 | 11/1973 | Guanella | 178/22 |
| 3,824,467 | 7/1974 | French | 178/22 |
| 3,921,151 | 11/1975 | Guanella | 178/22 |
| 3,970,790 | 7/1976 | Guanella | 178/22 |

Primary Examiner—Howard A. Birmiel
Attorney, Agent, or Firm—H. Christoffersen; Samuel Cohen; Carl V. Olson

[57] ABSTRACT

Serial data is scrambled at a transmitting terminal by storing it in sequential locations in a first random access memory, while previously stored information is read out of a second random access memory using a pseudo-random address counter. Whenever one memory is filled and the other memory is emptied, the roles of the memories are transposed. Similar apparatus at a receiving terminal is operated in synchronism and phase to unscramble the received data.

6 Claims, 2 Drawing Figures

SCRAMBLER AND UNSCRAMBLER FOR SERIAL DATA

The United States Government has rights in this invention pursuant to Contract No. DAAB07-71C-0182 awarded by the Department of the Army.

BACKGROUND OF THE INVENTION

Information transmission systems often include scrambling and unscrambling means to provide privacy. The information is rendered unintelligible when sent over a transmission channel, and is then again, rendered intelligible after reception. Scrambling and unscrambling means are also very important for providing more reliable transmission over noisy or interrupted communications channels. The errors introduced by the imperfections in the transmission channel affect the scrambled transmitted information and commonly have time durations spanning a plurality of information bits. When the information is received and unscrambled, the erroneous bits are given a random distribution throughout the data sequence, which minimizes the effects of the erroneous bits and improves the effectiveness of error detection and correction apparatus.

SUMMARY OF THE INVENTION

The order of serial data is changed by storing the data bits in a random access memory in sequential storage locations, and then reading out the data from storage locations having addresses in a pseudo-random sequence.

DESCRIPTION OF PREFERRED EMBODIMENT

Figure 1:
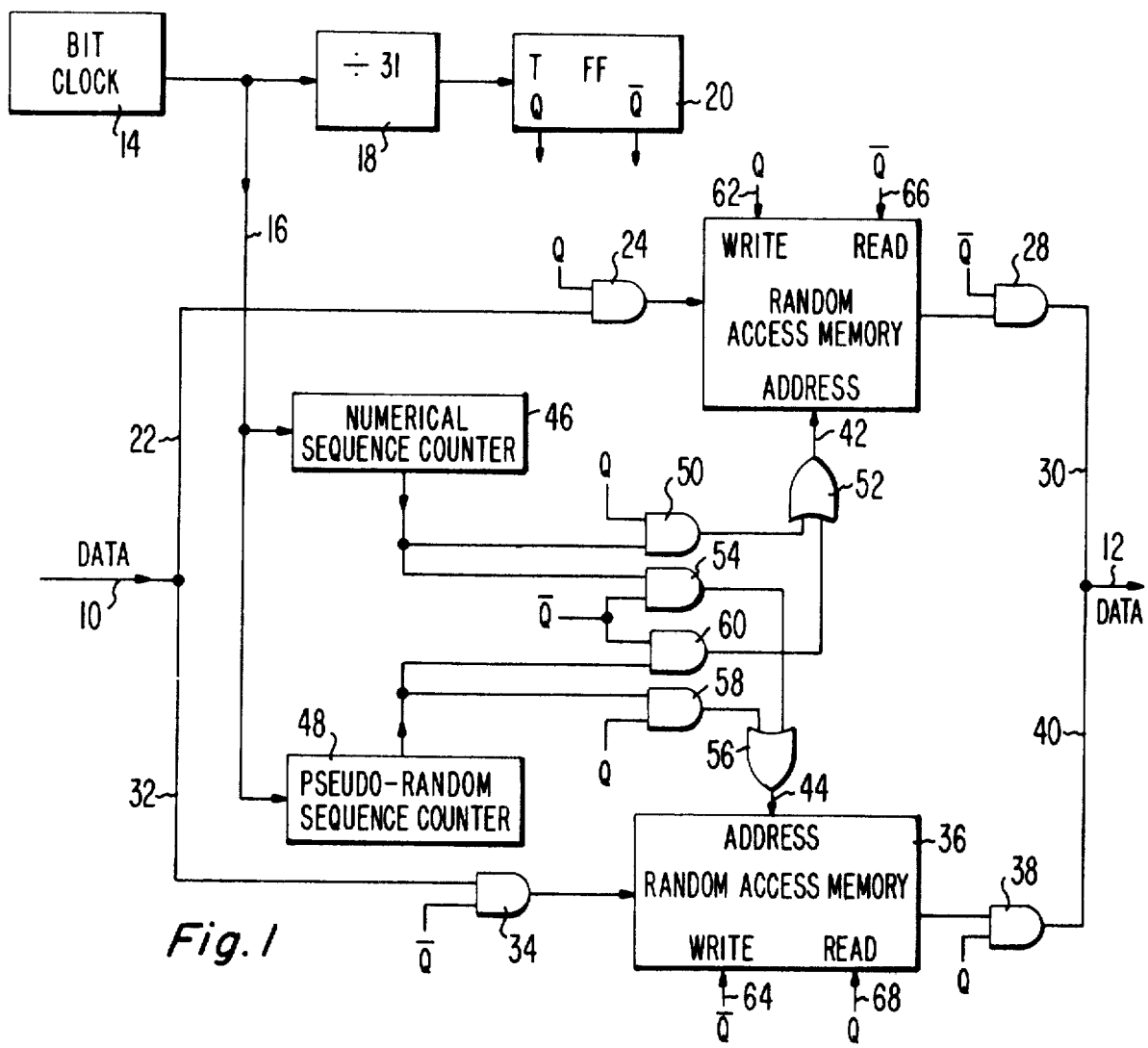
FIG. 1 is a diagram of a scrambler, constructed according to the teachings of the invention, for use at a transmitting terminal.

Reference is now made in greater detail to FIG. 1 for a description of a scrambler which translates locally-available information in the form of serial binary data on input line 10 to time-division interleaved or scrambled binary data on output line 12 for application to a data transmission channel (not shown). The scrambler includes a bit clock 14 providing clock pulses on line 16 repeating at the rate of data supplied at 10, a frequency divider 18, and a triggerable flip-flop 20 having a true output Q and a complement output $\bar{Q}$.

The input data at 10 can follow a path through line 22, "and" gate 24, a first random access memory 26, "and" gate 28 and line 30 to output line 12. Alternatively, input data at 10 can follow a path through line 32, "and" gate 34, a second random access memory 36, "and" gate 38 and line 40 to output line 12. Data is passed through "and" gates 24, 28, 34 and 38 at times when the gates are enabled by signals from outputs Q and $\bar{Q}$ from flip-flop 20.

Each of the random access memories 26 may be constructed on a single semiconductor chip and have storage locations for, say, 1,024 or 4,096 binary bits each separately addressable by a 10-bit address, or a 12-bit address, applied to the address input 42, or 44 of the memory. However, in the example to be described, each memory 26 and 36 has storage locations for 31 binary bits each addressed by a respective 5-bit address, not including 00000, from 00001 to 11111.

Addresses for application to memories 26 and 36 are obtained from a numerical sequence counter 46 and a pseudo-random sequence counter 48. Counter 46 counts in numerical order from 00000 to 11111, or in reverse numerical order from 11111 to 00000, in response to clock pulses supplied over line 16 from the bit clock 14. Counter 48 counts in a pseudo-random sequence in response to clock pulses from bit clock 14. If the counter 46 counts in reverse numerical order and the counter 48 counts in polynomial 45 E described on page 476 of W. W. Peterson and E. J. Weldon Jr., in the book "Error-Correcting Codes", Cambridge, Mass., MIT Press, 1972, the counting sequences are as follows:

Table I

| Clock Pulse Number (or Time) | INTERLEAVER State of Numerical Seq. Counter (or Bit Number) | State of Pseudo-Random Seq. Counter (or Bit Number) |
|---|---|---|
| 1 | 31 | 31 |
| 2 | 30 | 15 |
| 3 | 29 | 7 |
| 4 | 28 | 3 |
| 5 | 27 | 17 |
| 6 | 26 | 24 |
| 7 | 25 | 12 |
| 8 | 24 | 22 |
| 9 | 23 | 27 |
| 10 | 22 | 29 |
| 11 | 21 | 14 |
| 12 | 20 | 23 |
| 13 | 19 | 11 |
| 14 | 18 | 21 |
| 15 | 17 | 10 |
| 16 | 16 | 5 |
| 17 | 15 | 2 |
| 18 | 14 | 1 |
| 19 | 13 | 16 |
| 20 | 12 | 8 |
| 21 | 11 | 4 |
| 22 | 10 | 18 |
| 23 | 9 | 9 |
| 24 | 8 | 20 |
| 25 | 7 | 26 |
| 26 | 6 | 13 |
| 27 | 5 | 6 |
| 28 | 4 | 19 |
| 29 | 3 | 25 |
| 30 | 2 | 28 |
| 31 | 1 | 30 |

The output of numerical sequence counter 46 may be applied through "and" gate 50 and "or" gate 52 to the address input of memory 26, or, may be applied through "and" gate 54 and "or" gate 56 to the address input of memory 36.

The output of pseudo-random sequence counter may be applied through "and" gate "58" and "or" gate 56 to the address input of memory 36, or, may be applied through "and" gate 60 and "or" gate 52 to the address input of memory 26.

The paths taken by the outputs of counters 46 and 48 to the address inputs of the memories 26 and 36 are determined by the enabling signals applied to "and" gates 50, 54, 60 and 58 from outputs Q and $\bar{Q}$ of flip-flop 20. While the paths from counters 46 and 48 to the address inputs of memories 26 and 36 are shown by individual lines and individual gates, it will be understood that they each represent five parallel lines and five parallel gates for the five-bit addresses in the present examples described.

Memories 26 and 36 have write command inputs 62 and 64, respectively, and have read command inputs 66 and 68, respectively. The write and read commands alternate at a "frame" rate, the rate at which flip-flop 20 is triggered. The frame rate is equal to the bit rate from clock 14 divided by 31 in divider 18. (The divisor 31 is used in the present example instead of 32 because while each memory 26 and 36 will normally have storage locations for $2^n = 32$ bits, simple economical pseudo-random sequence counters have outputs for $2^n - 1$ addresses, or 31 addresses, omitting the all-zeros address). Therefore, a write command is applied to a memory for a period of time sufficient for the memory to be filled with 31 binary bits. Then the read command is applied for a period of time sufficient for all 31 stored bits to be read out from the memory.

OPERATION OF FIG. 1

The operation of FIG. 1 will be described during the frame when the flip-flop 20 provides a true output at Q, and then during the next frame when the flip-flop 20 provides a true output at $\bar{Q}$.

The Q signal supplies a write command at 62 to memory 26, and enables gate 24, so that input data at 10 is written into the memory at addresses in numerical sequence determined by the output of counter 46 applied through enabled gate 50 and gate 52 to the memory. During the same frame, the Q signal supplies a read command to memory 36, and enables output gate 38 to pass data read out from the memory at addresses having a pseudo-random sequence determined by the output of counter 48 passed through enabled gate 58 and gate 56 to the memory.

At the end of the Q frame when memory 26 is filled and memory 36 is emptied, the flip-flop 20 is triggered and it provides a $\bar{Q}$ output for the following $\bar{Q}$ frame. During the $\bar{Q}$ frame, memory 36 receives a write command at 64 and gate 34 is enabled so that data from 10 is written into memory 36 at addresses in numerical sequence determined by the output of counter 46 passed through enabled gate 54 and gate 56 to the memory. During the same $\bar{Q}$ frame, the $\bar{Q}$ signal supplies a read command to memory 26, and enables output gate 28 to pass data read out from the memory at addresses having a pseudo-random sequence determined by the output of counter 48 passed through enabled gate 60 and gate 52 to the memory.

It is thus seen that during frame Q, data is stored in numerical sequence in memory 26 while data is read out of memory 36 from locations having addresses in a pseudo-random sequence. Then, during frame $\bar{Q}$ the roles of memories 26 and 36 are transposed. All the data passed from line 12 to the transmission channel (not shown) is time-division scrambled or interleaved for purposes of privacy and/or error reduction.

DESCRIPTION OF FIG. 2

Figure 2:
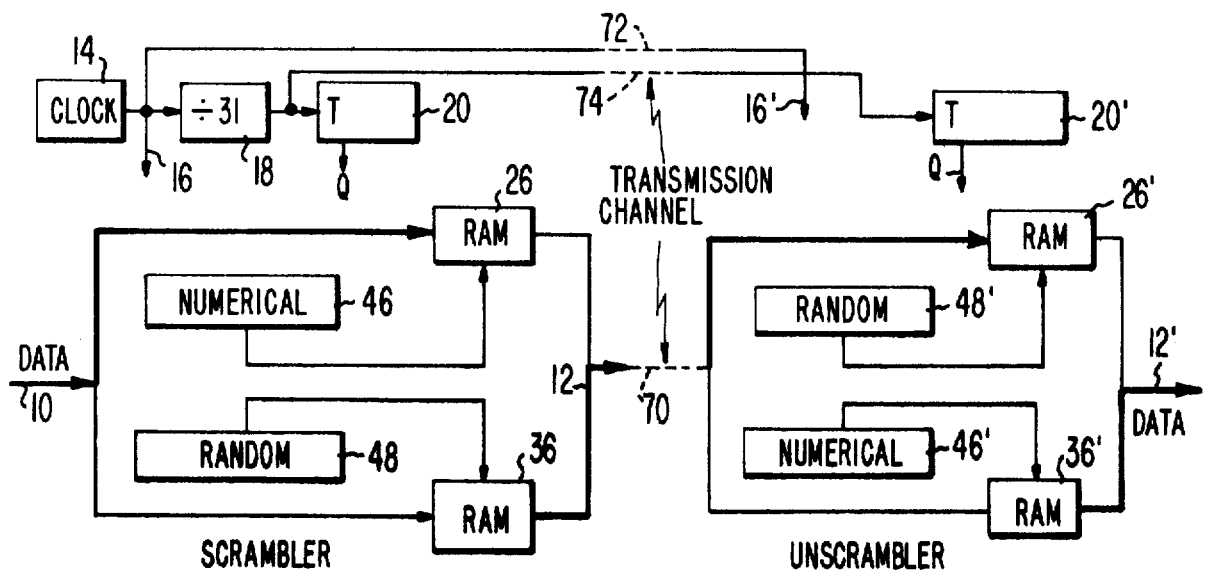
FIG. 2 is a simplified diagram of a transmission system including a scrambler at a transmitting terminal, a similar unscrambler at a receiving terminal, and means for synchronizing the operation of the scrambler and the unscrambler.

FIG. 2 is a simplified diagram of a complete transmission system including a scrambler like FIG. 1 at a transmitting terminal, a transmission channel 70, 72, 74 and an unscrambler like FIG. 1 at a receiving terminal. Note that the numerical counter 46 and the pseudo-random counter 48 in the scrambler are transposed as pseudo-random counter 48' and numerical counter 46' in the unscrambler. The transmission channel includes, in addition to a path 70 for data, a path 72 conveying clock pulses from clock 14 to the receiving terminal, and a path 74 conveying framing pulses from divider 18 to the flip-flop 20' at the receiving terminal. Any other suitable known method of keeping the receiving terminal in synchronism and phase with the transmitting terminal may be employed. Data paths in use during the Q frame are shown by heavy lines. Data paths in use during the $\bar{Q}$ frame are shown by light lines.

During the Q frame, the pseudo-randomly scrambled data sent over the transmission channel 70 is read into memory 26' in memory locations having the same pseudo-random pattern as the data had in transmitting memory 36. At the same time, during the Q frame, the data previously pseudo-randomly stored in receiving memory 36' is read out from numerically sequential memory locations, thereby ordering the serial data back into the original unscrambled sequence it had at input 10 at the transmitting terminal. Of course, during the following $\bar{Q}$ frame, the roles of memories 26 and 36 are transposed, and the roles of memories 26' and 36' are transposed, and the paths followed by data are light lines in FIG. 2.

While the system described is one in which the data paths accomodate bit-serial data, it will be understood that the data paths shown may represent a plurality of parallel paths to accommodate character-serial or word-serial data. In this case, the memory addressing components will serve memories 26 and 36 each constituted by a plurality of parallel-connected integrated circuit memories, each one storing one bit in each addressable storage location.

What is claimed is:

1. A data reordering system, comprising
   first and second random access memories,
   a numerical memory address counter providing addresses in numerical sequence,
   a pseudo-random memory address counter providing addresses in a pseudo-random sequence,
   means to store serial data in said first memory in storage locations determined by one of said address counters while serially reading data out of said second memory from storage locations determined by the other of said address counters, and
   means periodically to transpose said first and second memories.

2. A system as defined in claim 1 wherein said means to transpose said memories operates when one memory is filled and the other memory is emptied.

3. A system as defined in claim 1 wherein said means to store data in the first memory uses said numerical address counter while data is read out of said second memory using said pseudo-random address counter, whereby to scramble the serial data at a transmitting terminal.

4. A system as defined in claim 1 wherein said means to store data in the first memory uses said pseudo-random address counter while data is read out of said second memory using said numerical address counter, whereby to unscramble the data at a receiving terminal.

5. A data transmission system, comprising
   a serial data scrambler at a transmitting terminal and a serial data unscrambler at a receiving terminal, each including:
   two random access memories,
   a numerical memory address counter providing addresses in numerical sequence,
   a pseudo-random memory address counter providing addresses in a pseudo-random sequence,
   means to store serial data in one of said memories in storage locations determined by one of said address counters while serially reading data out of the other of said memories from storage locations determined by the other of said address counters, and means periodically to transpose the store and read-out operations of said memories using transposed ones of said address counters.

6. A system as defined in claim 5, and in addition a synchronizing and phasing means to cause the translation at the transmitting terminal of data in numerical sequence to data in pseudo-random sequence, at the same time that is causes the translation at the receiving terminal of data in said pseudo-random sequence to data in said numerical sequence.

* * * * *